US008281347B2

United States Patent
White et al.

(10) Patent No.: US 8,281,347 B2
(45) Date of Patent: Oct. 2, 2012

(54) SYSTEM AND METHOD OF RECEIVING OVER-THE-AIR TELEVISION CONTENT

(75) Inventors: Scott White, Austin, TX (US); James L. Cansler, Pflugerville, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1093 days.

(21) Appl. No.: 12/023,639

(22) Filed: Jan. 31, 2008

(65) Prior Publication Data

US 2009/0199256 A1 Aug. 6, 2009

(51) Int. Cl.
*H04N 7/18* (2006.01)
*H04N 7/173* (2011.01)
(52) U.S. Cl. ............ 725/80; 725/74; 725/105; 725/120
(58) Field of Classification Search ............... 725/74
See application file for complete search history.

(56) References Cited

U.S. PATENT DOCUMENTS

| 6,981,044 B1* | 12/2005 | Coez et al. ................... 709/226 |
| 2003/0018975 A1* | 1/2003 | Stone ............................ 725/105 |
| 2003/0106071 A1* | 6/2003 | Akamatsu et al. ............ 725/139 |
| 2004/0156614 A1* | 8/2004 | Bumgardner et al. .......... 386/46 |
| 2004/0221308 A1* | 11/2004 | Cuttner et al. ................... 725/46 |
| 2006/0075438 A1* | 4/2006 | Rehbock .......................... 725/80 |
| 2006/0114360 A1 | 6/2006 | Kortum et al. |
| 2006/0174279 A1 | 8/2006 | Sullivan et al. |
| 2007/0009229 A1* | 1/2007 | Liu ................................. 386/83 |
| 2007/0124780 A1* | 5/2007 | Lee ................................ 725/89 |
| 2008/0247544 A1* | 10/2008 | Candelore et al. ............ 380/241 |

* cited by examiner

*Primary Examiner* — Justin Shepard
(74) *Attorney, Agent, or Firm* — Guntin Meles & Gust, PLC; Pablo Meles

(57) ABSTRACT

A method of receiving over-the-air television content is disclosed and includes receiving input indicating a requested channel at a set-top box device. The set-top box device is coupled to a television via a first connection adapted to send television content to the television and via a second connection adapted to send data to, and receive data from, the television. The method also includes sending a control command from the set-top box device to the television via the second connection. The control command indicates that the television is to tune an over-the-air tuner at the television to the requested channel.

19 Claims, 6 Drawing Sheets

SYSTEM AND METHOD OF RECEIVING OVER-THE-AIR TELEVISION CONTENT

FIELD OF THE DISCLOSURE

The present disclosure generally relates to receiving over-the-air television content.

BACKGROUND

Television service providers typically communicate with subscribers via set-top box devices having one or more tuners. Where a set-top box device includes two tuners for example, a subscriber may receive content via a first tuner that is displayed at a television and receive additional content via a second tuner that may be recorded at the set-top box device or another device. The number of tuners at a set-top box device determines the number of separate actions that the set-top box device can perform with respect to content made available by a television service provider.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed methods, systems, or computer-readable media. Moreover, some statements may apply to some inventive features but not to others.

Figure 1:
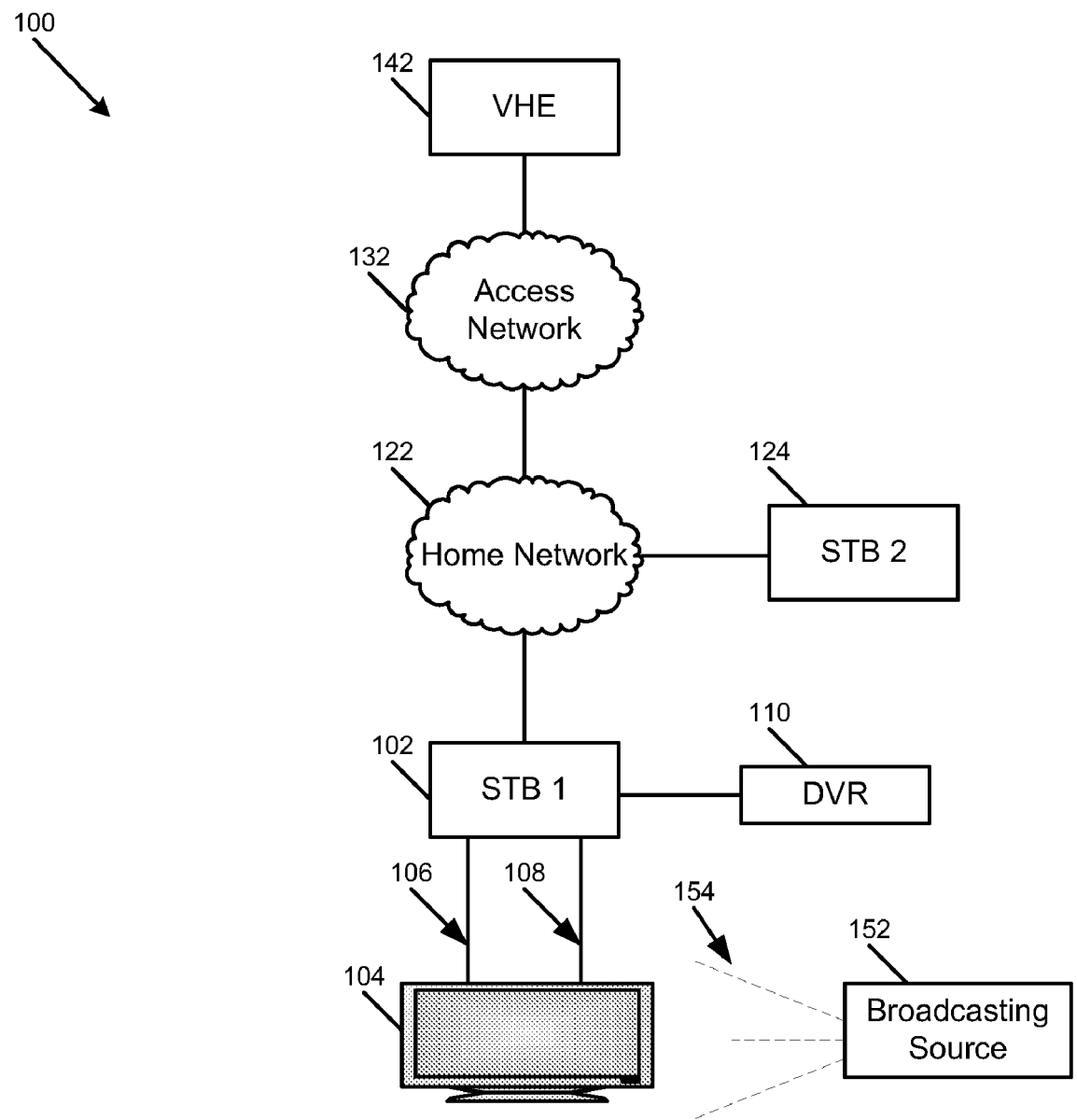
FIG. 1 is a block diagram illustrating a particular embodiment of a system to receive over-the-air television content.

FIG. 1 shows a particular embodiment of a system 100 to receive over-the-air television content. The system 100 includes a set-top box device 102 that is adapted to communicate with a television 104. The set-top box device 102 is coupled to a digital video recording (DVR) device 110. In an alternative embodiment, the DVR device 110 can be integrated with the set-top box device 102. The set-top box device 102 is adapted to communicate with a video head-end 142 of a television service provider, such as a cable television service provider, satellite television service provider, Internet Protocol Television (IPTV) television service provider, or other television service provider, via an access network 132. In an illustrative embodiment, the set-top box device 102 can be adapted to communicate with the access network 132 via a home network 122. The set-top box device 102 can also communicate with one or more other set-top box devices, such as the second set-top box device 124, via the home network 122.

The set-top box device 102 is adapted to communicate with the television 104 via a first connection 106 and a second connection 108. In one embodiment, the set-top box device 102 can be adapted to communicate television content to the television 104 via the first connection 106, which may include at least one composite video connection, a coaxial connection, a separate video (S-video) connection, a plurality of component video connections, a high-definition multimedia interface (HDMI) connection, an optical connection, or other connection. The set-top box device 102 can be adapted to send and receive control signals and other data via the second connection 108, which may include a high-definition multimedia interface (HDMI) connection, an optical connection, a universal serial bus (USB) connection, or other data transmission connection.

The television 104 includes at least one over-the-air tuner (a.k.a., "off-the-air") that is adapted to receive signals 154 carrying television content associated with channels from over-the-air broadcasting sources, such as the broadcasting source 152. In one embodiment, the television 104 can include an Advanced Television Systems Committee (ATSC) tuner, a National Television Systems Committee (NTSC) tuner, another type of tuner, or any combination thereof. Television content can include video content, audio content, or a combination thereof.

In an illustrative embodiment, the set-top box device 102 is adapted to detect at least one over-the-air tuner at the television 104. In one example, the set-top box device 102 is adapted to detect the over-the-air tuner(s) by receiving data from the television 104 via the second connection 108, the data indicating that the television 104 includes the over-the-air tuner(s). In another example, the set-top box device 102 is adapted to detect the over-the-air tuner(s) by receiving data identifying a make, model, or other identification of the television 104 via the data interface, and the set-top box device 102 is adapted to receive data indicating that such a television includes the over-the-air tuner(s) from memory or from a source communicating with the set-top box device 102 via the home network 122.

The set-top box device 102 is adapted to receive a channel request. The request may include, for example, input indicating a requested channel received from a user via a remote control device. In another embodiment, the channel request can be received from the second set-top box device 124 via the home network 122. The set-top box device 102 is adapted to determine whether any tuner at the set-top box device 102 is available for use. If all tuners at the set-top box device 102 are in use, or are otherwise unavailable, the set-top box device 102 is adapted to determine whether an over-the-air tuner at the television 104 is available for use. For instance, if the requested channel is a high-definition (HD) channel, the set-top box device 102 can be adapted to determine whether an ATSC tuner at the television 104 is in use. In another example, if the requested channel is a standard definition channel, the set-top box device 102 can be adapted to determine whether an NTSC tuner at the television 104 is in use.

The set-top box device 102 is adapted to send a control command to the television 104 when the set-top box device tuner(s) are unavailable and an over-the-air tuner at the television 104 is available. The control command is sent via the second connection 108 and indicates that the television 104 is to tune the over-the-air tuner to the requested channel. If the set-top box device 102 determines that the television content associated with the requested channel is to be recorded, is to be sent to the second set-top box device 124, is to be otherwise manipulated by the set-top box device 102, or any combination thereof, the control command can also indicate that the television 104 is to send over-the-air television content associated with the requested channel to the set-top box device 102 via the second connection 108. On the other hand, if the set-top box device 102 determines that the over-the-air television content associated with the requested channel is to be output at the television 104, the control command can indicate that the television 104 is to output television content associated with the requested channel (e.g., by displaying video content, outputting audio content, or a combination thereof). Alternatively, the control command can indicate that the television 104 is to send the over-the-air television content associated with the requested channel to the set-top box device 102 via the second connection 108 when the television content associated with the requested channel is to be output at the television 104, and the set-top box device 102 can be adapted to send the television content to the television 104 via the first connection 106.

The set-top box device 102 is adapted to receive television content associated with the requested channel from the television 104 via the second connection 108, when the control command indicates that the television 104 is to send the over-the-air television content associated with the requested channel to the set-top box device 102. The set-top box device 102 is adapted to manipulate the television content according to input receive from a user or other set-top box device. For instance, the set-top box device 102 is adapted to send the television content to the DVR 110 when the television content is to be recorded. In another example, the set-top box device 102 is adapted to send the television content to the second set-top box device 124 when the channel request is received from the second set-top box device 124.

Figure 2:
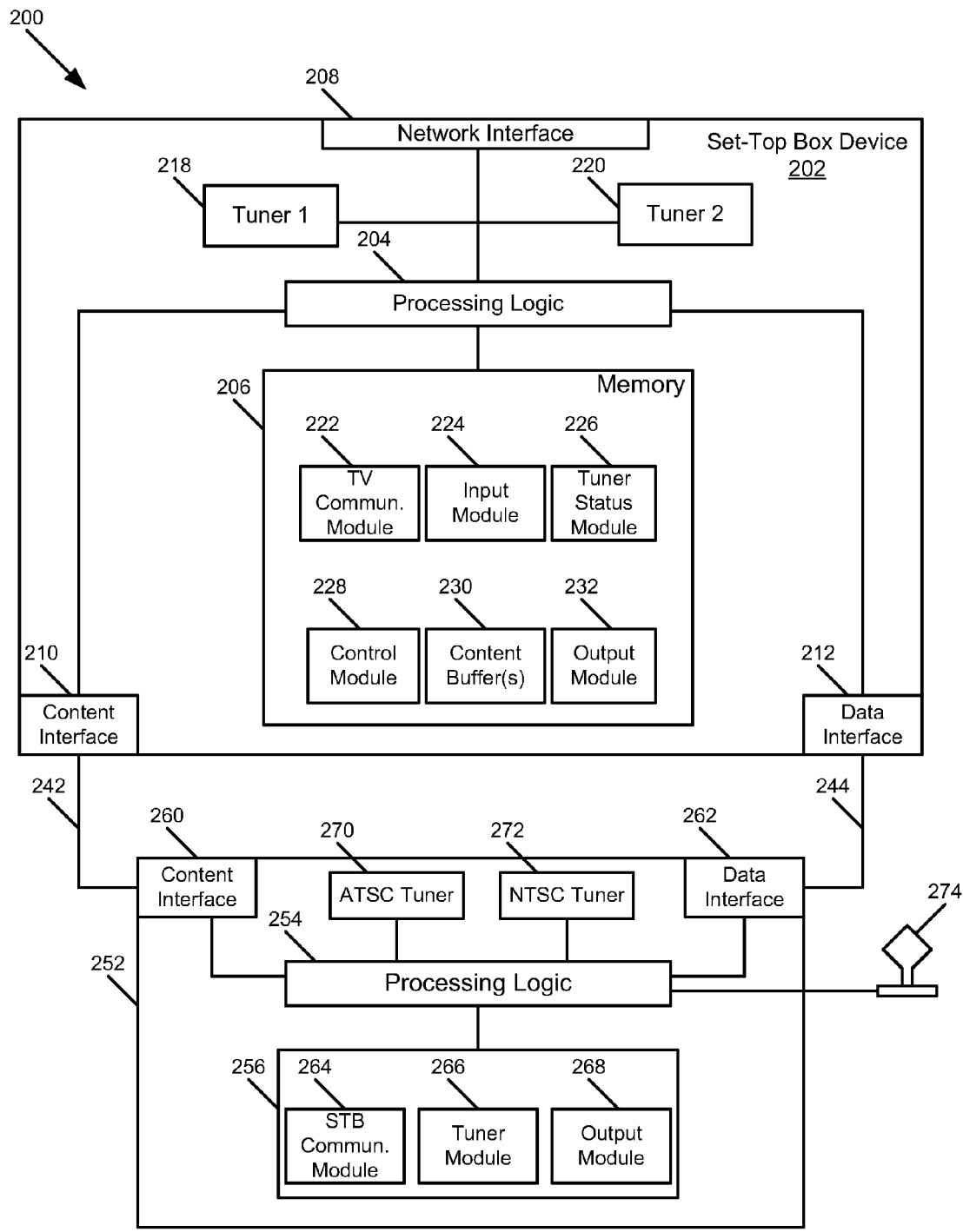
FIG. 2 is a block diagram illustrating a second particular embodiment of a system to receive over-the-air television content.

FIG. 2 shows a second particular embodiment of a system 200 to receive over-the-air television content. The system 200 includes a set-top box device 202 that is adapted to communicate with a television 252 via a first connection 242 and a second connection 244. The set-top box device 202 includes processing logic 204 and memory 206 accessible to the processing logic 204. Further, the set-top box device 202 can include a network interface 208 adapted to facilitate communication between the set-top box device 202 and a television service access network, such as a cable access network, a satellite access network, an Internet Protocol Television (IPTV) access network, or another television access network (not shown).

In addition, the set-top box device 202 includes a content interface 210 adapted to send television content to the television 252 via the first connection 242. The first connection 242 may comprise at least one composite connection, a plurality of component connections, an S-video connection, an optical connection, an HDMI connection, another connection, or any combination thereof. The set-top box device 202 also includes a data interface 212 adapted to send data to, and receive data from, the television 252 via the second connection 244. The second connection 244 may comprise an HDMI connection, optical connection or other data transmission connection. Further, the set-top box device 202 includes at least one tuner, such as a first tuner 218 and a second tuner 220, which are adapted to receive content associated with a plurality of channels via the network interface 208.

In a particular embodiment, the memory 206 includes a plurality of modules 222-232. The modules 222-232 can include computer instructions that are readable and executable by the processing logic 204 to implement various functions of the set-top box device 202 with respect to receiving over-the-air television content. For example, the modules 222-232 can represent various aspects of one or more software applications, operating systems, or other computer programs. In other embodiments, the modules 222-232 can be implemented as hardware logic or a combination of hardware logic and computer instructions.

The memory 206 includes a television communication module 222 that is executable by the processing logic 204 to detect at least one over-the-air tuner, such as an ATSC tuner, an NTSC tuner, another type of over-the-air tuner, or any combination thereof, at the television 252. In one embodiment, the television communication module 222 can be executable by the processing logic 204 to receive data from the television 252 via the data interface 212, where the data indicates that the television 252 includes the over-the-air tuner(s). In another embodiment, the television communication module 222 can be executable by the processing logic 204 to receive data identifying a make, model, or other identification of the television 252 via the data interface 212, and to retrieve data indicating that such a television includes the over-the-air tuner(s), from memory or from a source communicating with the set-top box device 202 via the network interface 208.

The memory 206 also includes an input module 224 that is executable by the processing logic 204 to receive and process inputs from a user, another set-top box device, another source, or any combination thereof. Such inputs may include channel change commands, recording commands, other commands, or any combination thereof. Further, the memory 206 includes a tuner status module 226 that is executable by the processing logic 204 to determine whether the first tuner 218 and the second tuner 220 are available for use and, when both the first tuner 218 and the second tuner 220 are available for use, to determine whether at least one over-the-air tuner at the television 252 is available for use. For instance, if the requested channel is a high-definition (HD) channel, the tuner status module 226 can be executable by the processing logic 204 to determine whether the ATSC tuner 270 at the television 252 is in use. In another example, if the requested channel is a standard definition channel, the tuner status module 226 can be executable by the processing logic 204 to determine whether the NTSC tuner 272 at the television 252 is in use. In an illustrative embodiment, the tuner status module 226 can store a list of accessible tuners that are at the set-top box device 202 and at the television 252.

The memory 206 includes a control module 228 that is executable by the processing logic 204 to send a control command to the television 252 via the data interface 212 when the set-top box tuners 218, 220 are not available for use and an over-the-air tuner at the television 252 is available for use. The control command indicates that the television 252 is to tune the over-the-air tuner to the requested channel. The control command can also indicate whether the television 252 is to send the television content associated with the requested channel to the set-top box device 202 via the second connection 244 or to output the television content at the television 252.

In a particular embodiment, the memory 206 includes one or more content buffers 230 to receive and buffer television content received from a television service access network via the network interface 208 and from the television 252 via the data interface 212. At least one of the content buffer(s) 230 can receive television content associated with a requested channel from the television 252. The memory 206 also includes an output module 232 that is executable by the processing logic 204 to manipulate the television content. For instance, the output module 232 can be executable by the processing logic 204 to send television content to a digital video recorder (DVR) that is coupled to or integrated with the set-top box device 202 when the television content is to be recorded; to send the television content to another set-top box device via the network interface 208 when the channel request is received from the other set-top box device; to send the television content to the television 252 via the content interface 210 when the television content is to be output at the television 252; to otherwise manipulate the television content; or any combination thereof.

The television 252 includes processing logic 254 and memory 256 accessible to the processing logic 254. In addition, the television 252 includes a content interface 260 that is adapted to receive television content from the set-top box device 202 via the first connection 242. The television 252 also includes a data interface 262 that is adapted to send data to, and receive data from, the set-top box device 202 via the second connection 244. Further, the television 252 includes one or more tuners, such as the ATSC tuner 270 and the NTSC tuner 272. The television 252 is adapted to receive over-the-air television content associated with one or more channels via the tuners 270, 272. In an illustrative embodiment, the over-the-air television content can be received via a receiver 274 (or transceiver) that may be coupled to or integrated with the television 252.

In a particular embodiment, the memory 256 includes a plurality of modules 264-268. The modules 264-268 can include computer instructions that are readable and executable by the processing logic 254 to implement various functions of the television 252 with respect to receiving over-the-air television content. For example, the modules 264-268 can represent various aspects of one or more software applications, operating systems, or other computer programs. In other embodiments, the modules 264-268 can be implemented as hardware logic or a combination of hardware logic and computer instructions.

The memory 256 includes a set-top box (STB) communication module 264 that is executable by the processing logic 254 to send data to the set-top box device 202 indicating identifying information related to the television 252, indicating that the television 252 includes one or more over-the-air tuners, indicating other information, or any combination thereof. The STB communication module 264 is executable by the processing logic 254 to send such data via the data interface 262. In one embodiment, the STB communication module 264 can be executable by the processing logic 254 to send the data through a dialog with the set-top box device 202.

The memory 256 also includes a tuner module 266 that is executable by the processing logic 254 to receive a control command from the set-top box device 202 via the data interface 262. The control command indicates that an over-the-air tuner at the television 252 is to be tuned to a particular channel. The control command can also indicate that the television content associated with the channel is to be sent to the set-top box device 202 via the second connection 244 or that the television content is to be output at the television 252. The tuner module 266 is executable by the processing logic 254 to tune the over-the-air tuner to the requested channel.

The memory 256 includes an output module 268 that is executable by the processing logic 254 to output over-the-air television content according to a control command. For instance, the output module 268 is executable by the processing logic 254 to display or otherwise output television content associated with a requested channel when the control command indicates that the over-the-air television content is to be output at the television 252, and to output the over-the-air television content to the set-top box device 202 via the data interface 262 when the control command indicates that the television 252 is to send the television content to the set-top box device 202. The output module 268 is also executable by the processing logic 254 to display or otherwise output content received via the content interface 260 from the set-top box device 202, at the television 252.

Figure 3:
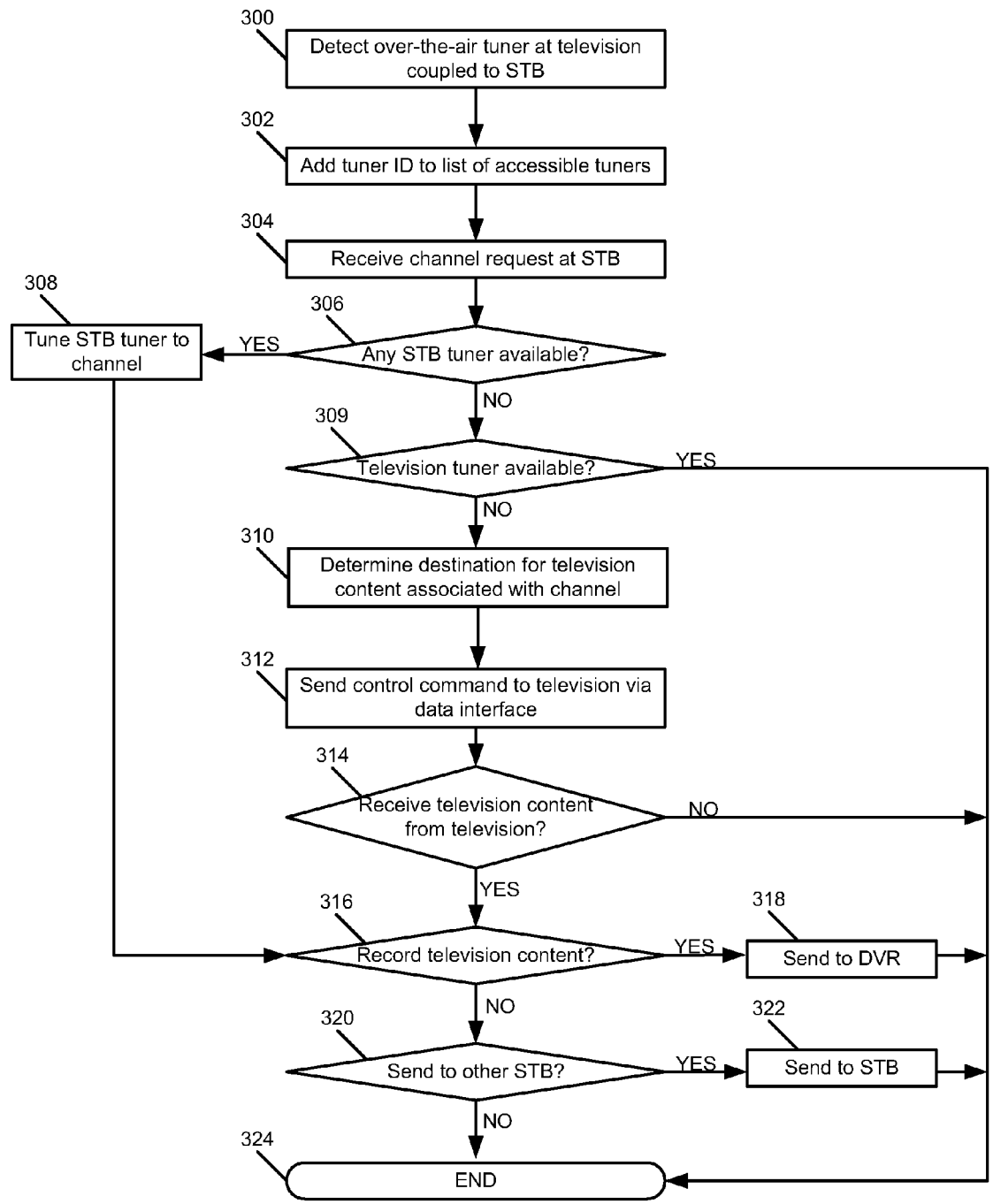
FIG. 3 is a flow diagram illustrating a particular embodiment of a method of receiving over-the-air television content.

FIG. 3 shows a particular embodiment of a method of receiving over-the-air television content. At block 300, a set-top box device detects an over-the-air tuner at a television coupled to the set-top box device. The set-top box device is coupled to the television via a content interface adapted to send content to the television for viewing, listening, or a combination thereof. The set-top box device is also coupled to the television via a data interface adapted to send data to, and receive data from, the television. In one embodiment, the set-top box device can detect the over-the-air tuner by receiving data indicating that the television includes the over-the-air tuner, from the television via the data interface. In another embodiment, the set-top box device can detect the over-the-air tuner by receiving data identifying a make, model, or other identification of the television via the data interface, and the set-top box device can retrieve data indicating that such a television includes the over-the-air tuner from memory or from a source communicating with the set-top box device via a network.

Moving to block 302, in a particular embodiment, the set-top box device adds an identification of the over-the-air tuner to a list of tuners that are accessible to the set-top box device. Proceeding to block 304, the set-top box device receives a channel request. The request may be received from a user via a remote control device, for example. In another example, the channel request can be received from another set-top box device via a home network. Continuing to decision node 306, the set-top box device determines whether each tuner at the set-top box device is available for use. If a tuner at the set-top box device is available for use, the method advances to block 308, and the set-top box device tunes the available tuner to the requested channel. The method then moves to decision node 316.

Conversely, if there is no available tuner at the set-top box device, the method moves to decision node 309, and the set-top box device determines whether the over-the-air tuner is available for use. If the over-the-air tuner is not available for use, the method terminates at 324. On the other hand, if the over-the-air tuner is available for use, the method advances to block 310, and the set-top box device determines a destination for television content associated with the channel. For instance, the set-top box device can receive a user input indicating that the television content is to be output at the display device or recorded at a digital video recorder (DVR). In another example, the set-top box device can determine that the television content is to be sent to a requesting set-top box device.

At block 312, the set-top box device sends a control command to the television via the data interface to tune the over-the-air tuner to the requested channel. The control command can also indicate that television content associated with the requested channel is to be output at the television or is to be sent to the set-top box device via the data interface. Moving to decision node 314, the set-top box determines whether it has received television content from the television. If the set-top box device does not receive the television content (e.g., because the television content is to be output by the television), the method terminates at 324. On the other hand, if the set-top box device receives the television content, the method proceeds to decision node 316.

Moving to decision node 316, the set-top box device determines whether the television content received from the television is to be recorded. If the television content is to be recorded, the method proceeds to block 318, and the set-top box device sends the television content to a DVR device or other recording device that may be coupled to or integrated with the set-top box device. Returning to decision node 316, if the set-top box device determines that the set-top box device is not to be recorded, the method proceeds to decision node 320, and the set-top box device determines whether the television content is to be sent to another set-top box device. If the set-top box device determines that the television content is to be sent to another set-top box device, the method continues to block 322, and the set-top box device sends the television content to the other set-top box device. The method terminates at 324.

Figure 4:
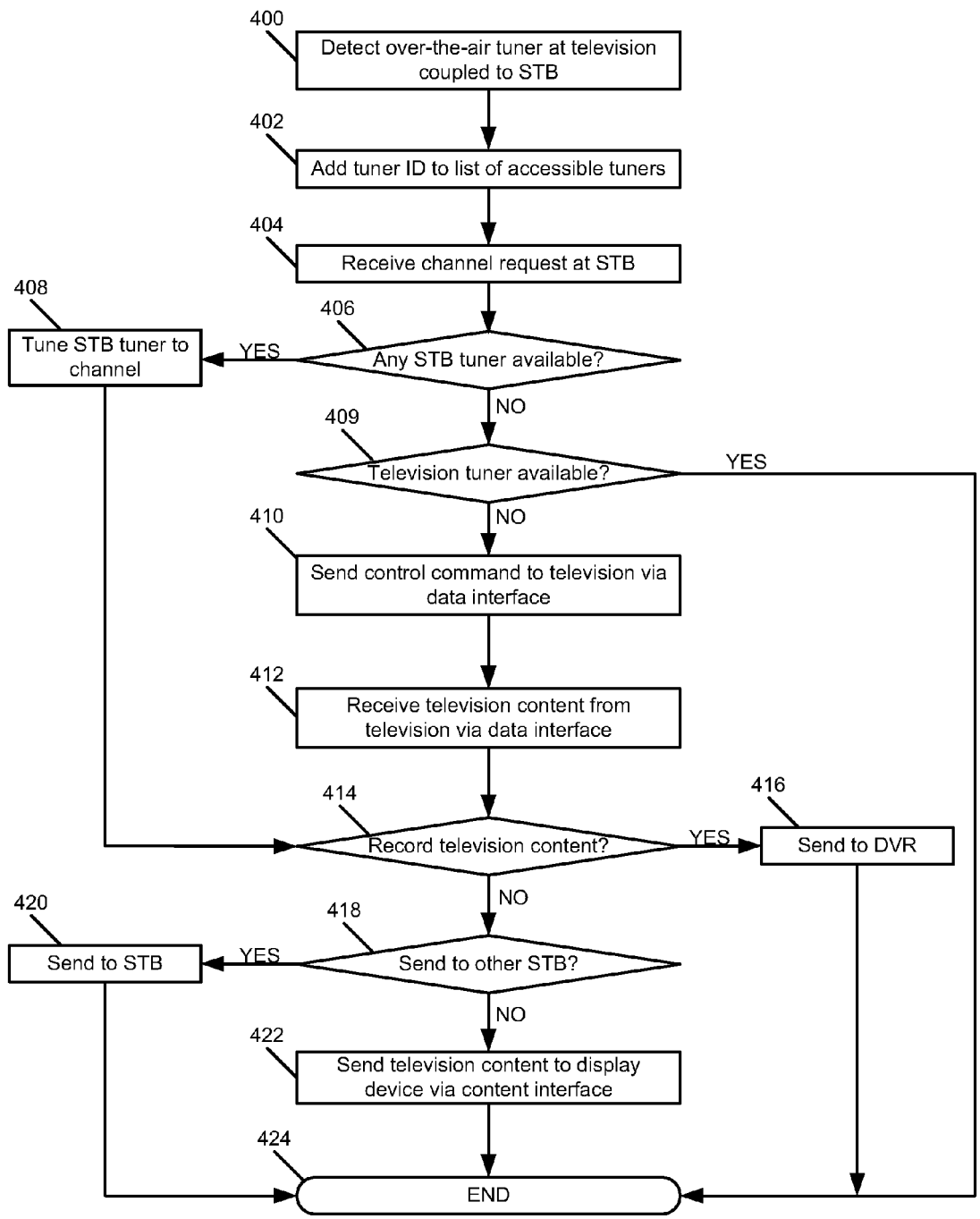
FIG. 4 is a flow diagram illustrating a second particular embodiment of a method of receiving over-the-air television content.

FIG. 4 shows a second particular embodiment of a method of receiving over-the-air television content. At block 400, a set-top box device detects an over-the-air tuner, such as an ATSC tuner or an NTSC tuner, at a television coupled to the set-top box device. The set-top box device is coupled to the television via a content interface. The set-top box device is also coupled to the television via a data interface. Moving to block 402, in a particular embodiment, the set-top box device adds an identification of the over-the-air tuner to a list of tuners that are accessible to the set-top box device. Proceeding to block 404, the set-top box device receives a channel request. The request may be received from a user via a remote control device, for example. In another example, the channel request can be received from another set-top box device via a home network.

Continuing to decision node 406, the set-top box device determines whether each tuner at the set-top box device is available for use. If a tuner at the set-top box device is available for use, the method advances to block 408, and the set-top box device tunes the available tuner to the requested channel. The method then moves to decision node 414. Conversely, if there is no available tuner at the set-top box device, the method moves to decision node 409, and the set-top box device determines whether the over-the-air tuner is available for use. If the over-the-air tuner is not available for use, the method terminates at 424. On the other hand, if the over-the-air tuner is available for use, the method advances to block 410, and the set-top box device sends a control command to the television via the data interface to tune the over-the-air tuner to the requested channel and to send the television content associated with the channel to the set-top box device. At block 412, the set-top box device receives the television content via the data interface.

Moving to decision node 414, the set-top box device determines whether the television content received from the television is to be recorded. If the television content is to be recorded, the method proceeds to block 416, and the set-top box device sends the television content to a digital video recorder (DVR) device or other recording device that may be coupled to or integrated with the set-top box device. Returning to decision node 414, if the set-top box device determines that the set-top box device is not to be recorded, the method proceeds to decision node 418, and the set-top box device determines whether the television content is to be sent to another set-top box device. If the set-top box device determines that the television content is to be sent to another set-top box device, the method continues to block 420, and the set-top box device sends the television content to the other set-top box device. Otherwise, the method advances to block 422, and the set-top box device sends the television content to the display device via the content interface. The method terminates at 424.

Figure 5:
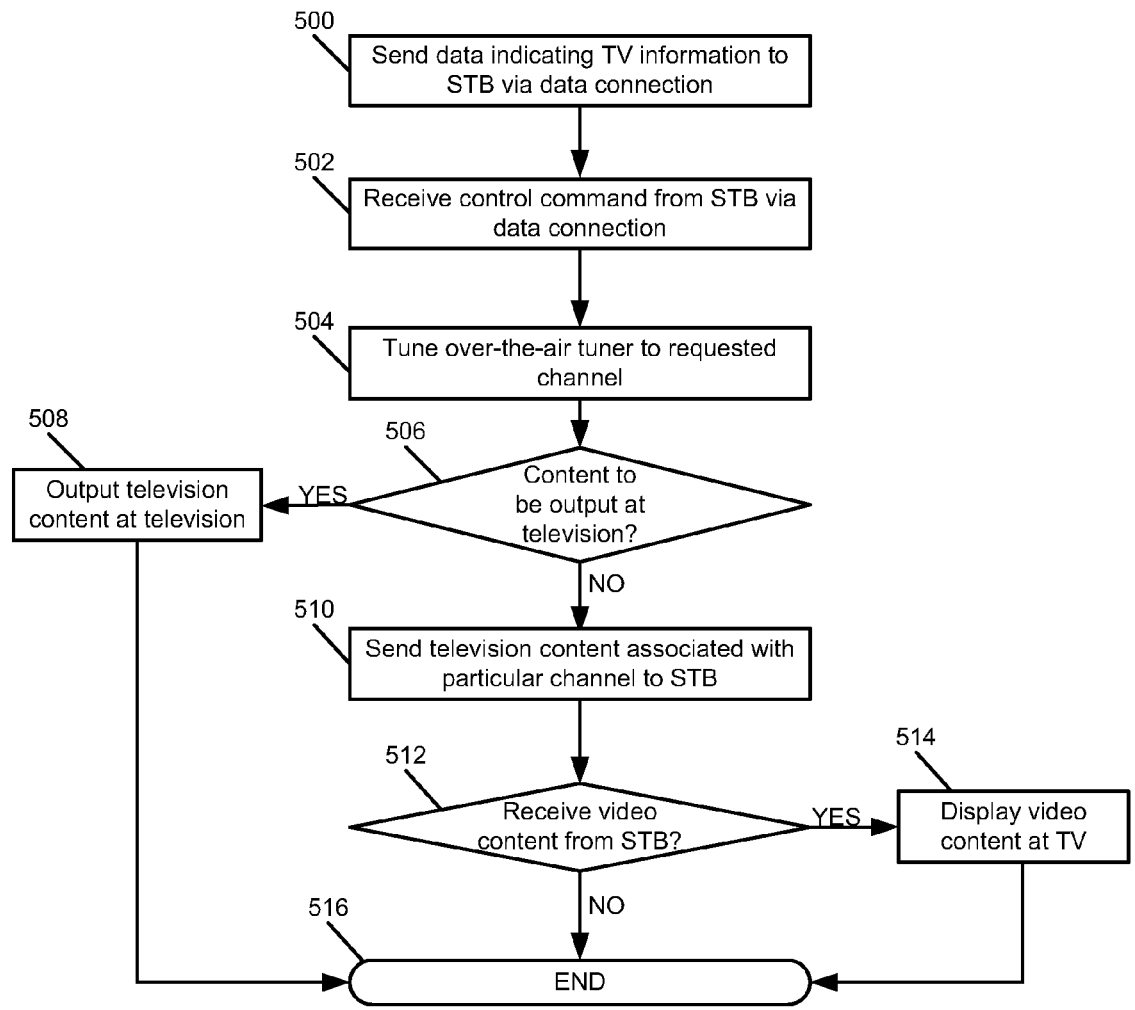
FIG. 5 is a flow diagram illustrating a third particular embodiment of a method of receiving over-the-air television content.

FIG. 5 shows a third particular embodiment of a method of receiving over-the-air television content. At block 500, a television sends data to a set-top box device indicating information related to the television. For instance, the television can send data indicating identifying information related to the television, data indicating that the television includes one or more over-the-air tuners, other information, or a combination thereof. The television sends the data via a data connection, such as an HDMI connection.

Moving to block 502, the television receives a control command from the set-top box device via the data connection. The control command indicates that an over-the-air tuner at the television is to be tuned to a particular channel. The control command can also indicate that television content associated with the channel is to be sent to the set-top box device via the data connection or is to be output at the television. Proceeding to block 504, the television tunes the over-the-air tuner to the particular channel. Continuing to decision node 506, the television determines whether the television content associated with the requested channel is to be output at the television. If the television is to output the television content in accordance with the control command, the method advances to block 508, and the television outputs the television content. Whereas, if the television is to send the television content to the set-top box device, the method advances to block 510, and the television sends the television content associated with the particular channel to the set-top box device via the data connection.

At decision node 512, the television determines whether it has received television content from the set-top box device via another connection that is adapted to transmit television content from the set-top box device to the television. If the television has received television content from the set-top box device, the method continues to block 514, and the television outputs the television content. The method terminates at 516.

In some embodiments, the methods disclosed herein can be performed as described with reference to FIGS. 3-5. In other embodiments, aspects of the methods can be performed in alternative sequences or simultaneously. Moreover, in some embodiments, a set-top box device can detect multiple over-the-air tuners at a television and can determine whether some or all of the over-the-air tuners are available for use before sending a control command to the television.

Figure 6:
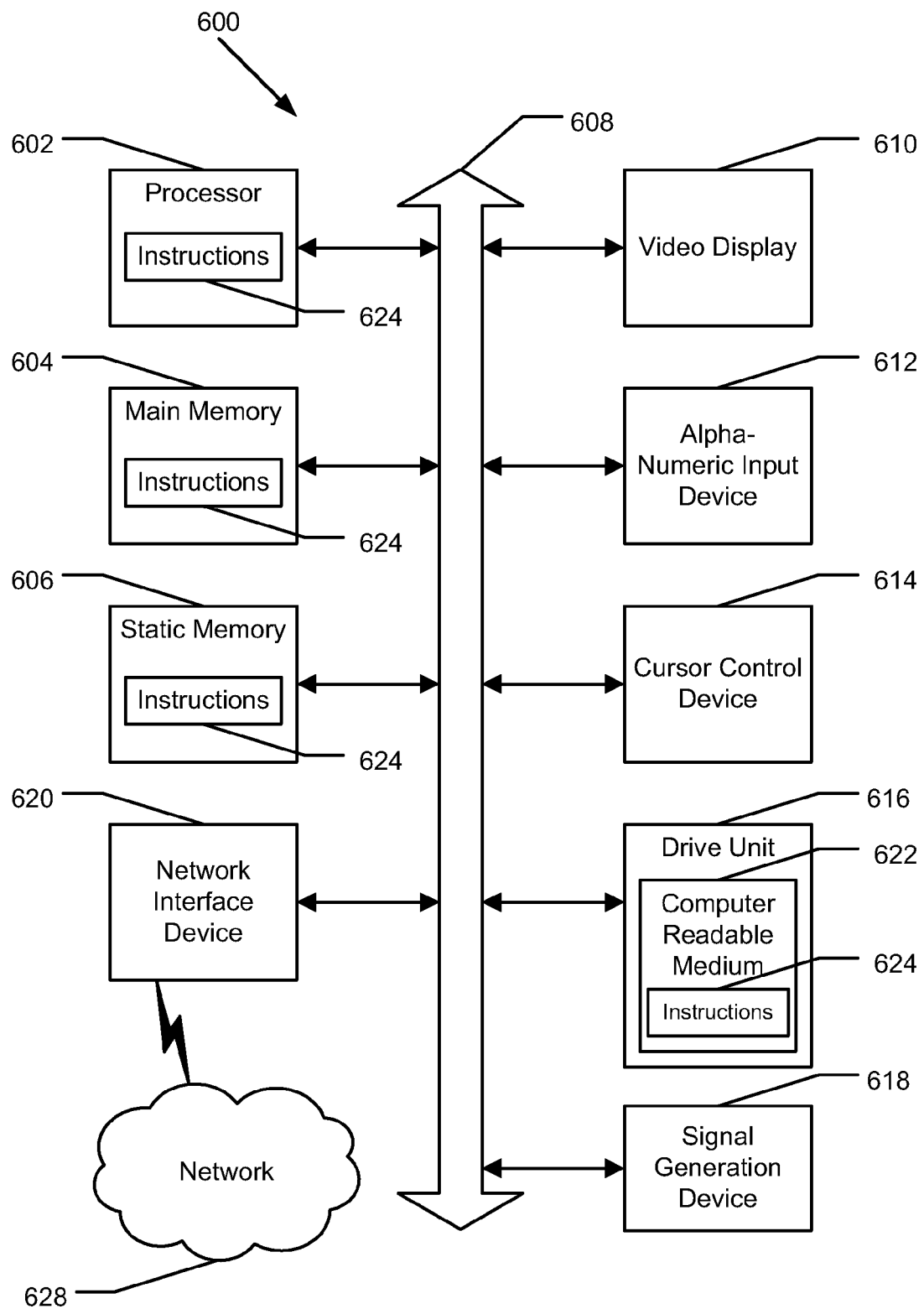
FIG. 6 is a block diagram illustrating a particular embodiment of a general computer system.

FIG. 6 shows an illustrative embodiment of a general computer 600 including a set of instructions that can be executed to cause the computer system to perform any one or more of the methods or computer based functions disclosed herein. The computer system 600 may operate as a standalone device or may be connected, e.g., using a network, to other computer systems or peripheral devices. In an illustrative embodiment, such standalone and peripheral devices can include, for example, set-top box devices, televisions, other devices, or any combination thereof, as illustrated in FIGS. 1-2.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, e.g., a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media. The network interface device 620 can provide connectivity to a network 626, e.g., a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
receiving input indicating a requested channel at a set-top box device coupled to a television via a first connection adapted to send television content to the television and coupled to the television via a second connection adapted to send control data to, and receive data from, the television, wherein the second connection comprises a high-definition multimedia interface connection;
determining a destination for television content associated with the requested channel;
sending a control command from the set-top box device to the television via the second connection, wherein the control command indicates that the television is to tune an over-the-air tuner at the television to the requested channel, and wherein the control command indicates that the television is to send television content associated with the requested channel to the set-top box device via the second connection or that the television is to output television content associated with the requested channel at the television; and
receiving over-the-air television content at the set-top box via the second connection from the television in accordance with the control command.

2. The method of claim 1, further comprising determining whether at least one second tuner at the set-top box device is available for use before sending the control command, wherein the control command is sent when the at least one second tuner at the set-top box device is not available for use.

3. The method of claim 2, further comprising determining whether the over-the-air tuner at the television is available for use before sending the control command, wherein the control command is sent when the at least one second tuner at the set-top box device is not available for use and the over-the-air tuner at the television is available for use.

4. The method of claim 1, further comprising receiving the over-the-air television content at the set-top box device via the second connection after determining a destination for television content associated with the requested channel.

5. The method of claim 1, further comprising sending the over-the-air television content to a digital video recorder device.

6. The method of claim 1, further comprising sending the over-the-air television content to another set-top box device, wherein the input indicating the requested channel is received from the other set-top box device.

7. A set-top box device, comprising:
a first interface for sending television content from a first television source to a television via a first connection;
a second interface adapted to send data to, and receive data from, the television via a data connection separate from the first connection and adapted to receive over-the-air television content from the television via the data connection, wherein the data connection is a second connection and wherein the second connection comprises a high-definition multimedia interface connection;
processing logic and memory accessible to the processing logic, wherein the memory includes instructions executable by the processing logic to:
receive input indicating a requested channel;
send a control command to the television via the second interface, wherein the control command instructs the television to tune an over-the-air tuner at the television to the requested channel; and
receive the over-the-air television content from the over-the-air tuner in the television via the data connection.

8. The set-top box device of claim 7, wherein the data connection comprises a high definition multimedia interface connection.

9. A television, comprising:
an over-the-air tuner;
a first interface adapted to receive television content from a set-top box device via a first connection;
a second interface adapted to send data to, and receive data from, the set-top box device via a data connection separate from the first connection and further adapted to send the television content via the data connection to the set-top box device, wherein the data connection comprises a high-definition multimedia interface connection;
processing logic and memory accessible to the processing logic, the memory including instructions executable by the processing logic to:
receive a control command from the set-top box device via the second interface, the control command indicating that the television is to tune the over-the air tuner to a requested channel, wherein the television is adapted to receive television content associated with the requested channel from a broadcast source via the over-the-air tuner;
tune the over-the-air tuner to the requested channel;
transmit over-the-air television content from the over-the-air tuner in the television to the set-top box device via the data connection; and
output the television content at the television when the control command indicates that television content received via the over-the-air tuner is to be output at the television.

10. The television of claim 9, wherein the memory includes instructions executable by the processing logic to send the television content to the set-top box device via the data connection.

11. The television of claim 9, wherein the over-the-air tuner is one of a plurality of over the-air tuners at the television.

12. The television of claim 11, wherein the plurality of over-the-air tuners includes at least one advanced television systems committee tuner, at least one national television systems committee tuner, or any combination thereof.

13. The television of claim 9, wherein the first interface adapted to receive television content from the set-top box device from at least one of a plurality of tuners at the set-top box via the first connection.

14. A non-transitory computer-readable medium comprising processor-readable instructions which, responsive to being executed by processing logic, cause the processing logic to perform operations comprising:
- sending television content from a set-top box to a television via a first interface including a first connection adapted to send the television content to the television;
- receiving input indicating a requested channel at the set-top box device;
- determining a destination for television content associated with the requested channel; and
- sending a control command from the set-top box device to the television via a second interface including a second connection adapted to send data to, and receive data from, the television, wherein the control command indicates that the television is to tune an over the-air tuner at the television to the requested channel and wherein the second connection is adapted to receive the television content from a tuner in the television wherein the second connection comprises a high-definition multimedia interface connection and wherein the control command indicates that the television is to send television content associated with the requested channel to the set-top box device via the second connection or that the television is to output television content associated with the requested channel at the television.

15. The non-transitory computer-readable medium of claim 14, comprising processor-readable instructions which when executed by the processing logic cause the processing logic to perform operations comprising receiving data from the television via the second interface, the data indicating that the television includes the over-the-air tuner.

16. The non-transitory computer-readable medium of claim 14, comprising processor-readable instructions which when executed by the processing logic cause the processing logic to perform operations comprising
- receiving data from the television via the second interface, the data including identifying information related to the television; and
- retrieving the identifying information indicating that the identified television includes the over-the-air tuner.

17. A non-transitory computer-readable medium comprising processor-readable instructions which, responsive to being executed by processing logic, cause the processing logic to perform operations comprising:
- receiving television content from a set-top box device via a first interface;
- receiving a control command from the set-top box device at a television via a second interface adapted to send data to, and receive data from, the set-top box device, wherein the control command indicates that the television is to tune an over-the air tuner at the television to a requested channel, wherein the control command indicates that the television is to send television content received via the over-the-air tuner to the set-top box device or is to output the television content at the television, and wherein the second interface includes a high-definition multimedia interface connection;
- tuning the over-the-air tuner to the requested channel; and
- sending over-the-air television content to the set-top box device via the second interface or outputting the over-the-air television content received via the over-the-air tuner at the television, in accordance with the control command.

18. The non-transitory computer-readable medium of claim 17, comprising processor-readable instructions which when executed by the processing logic cause the processing logic to perform operations comprising receiving the television content from the set-top box device via the first interface and outputting the television content at the television.

19. The non-transitory computer-readable medium of claim 17, comprising processor-readable instructions which when executed by the processing logic cause the processing logic to perform operations comprising sending data indicating identification information, data indicating that the television includes one or more over-the-air tuners, or any combination thereof, to the set-top box device via the second interface.

* * * * *